(12) United States Patent  
Wycech

(10) Patent No.: US 6,287,666 B1  
(45) Date of Patent: Sep. 11, 2001

(54) REINFORCED STRUCTURAL MEMBERS

(75) Inventor: Joseph S. Wycech, Grosse Pointe Shores, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/597,078

(22) Filed: Jun. 20, 2000

Related U.S. Application Data

(62) Division of application No. 09/103,031, filed on Jun. 23, 1998, now Pat. No. 6,096,403.
(60) Provisional application No. 60/053,053, filed on Jul. 21, 1997.

(51) Int. Cl.[7] .................................................... B32B 3/26
(52) U.S. Cl. ..................... 428/122; 428/36.5; 428/36.9; 52/735.1; 296/146.6; 296/188
(58) Field of Search .................................. 428/36.5, 36.9, 428/122; 52/735.1; 296/146.6, 188

(56) References Cited

U.S. PATENT DOCUMENTS 4,901,500 * 2/1990 Wycech .
4,995,545 * 2/1991 Wycech .
5,124,186 * 6/1992 Wycech .

* cited by examiner

Primary Examiner—Alexander S. Thomas
(74) Attorney, Agent, or Firm—Connolly, Bove, Lodge & Hutz, LLP

(57) ABSTRACT

A channel-shaped section has a thin, local reinforcement shell separated from the channel-shaped section by a layer of structural foam. At the reinforced section an arch geometry is utilized which extends in a direction opposite that of the force to which the member is subjected. The arch may be present as the channel-shaped member, the reinforcement shell or both the channel-shaped member and the shell. A portion of the shell contacts the channel-shaped member and is attached thereto by welding or other means of attachment.

20 Claims, 2 Drawing Sheets

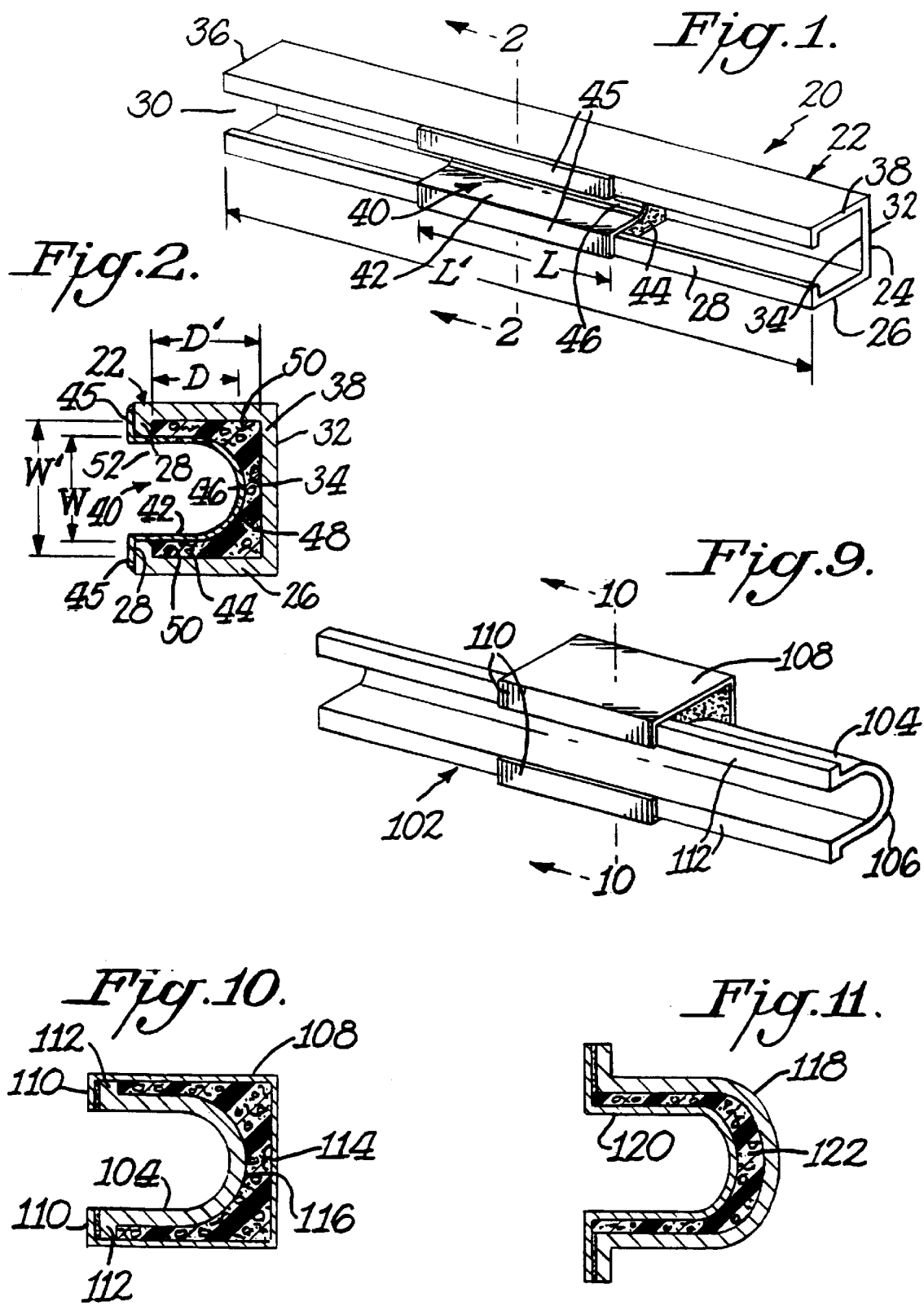

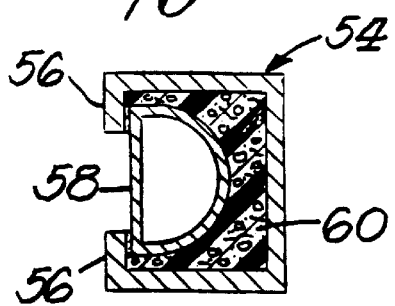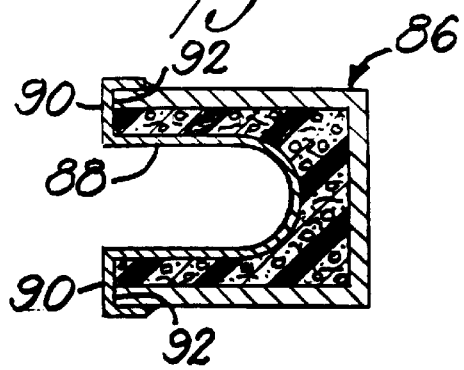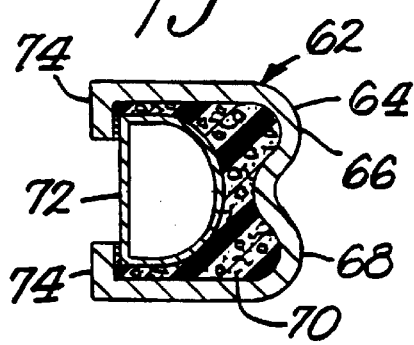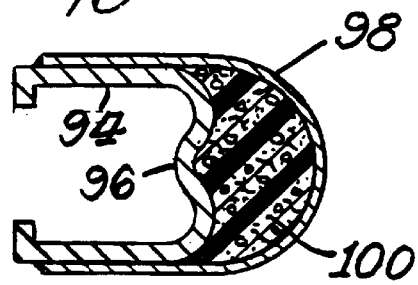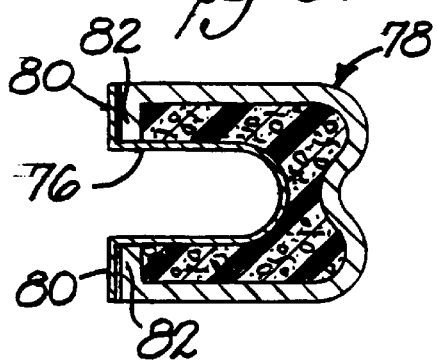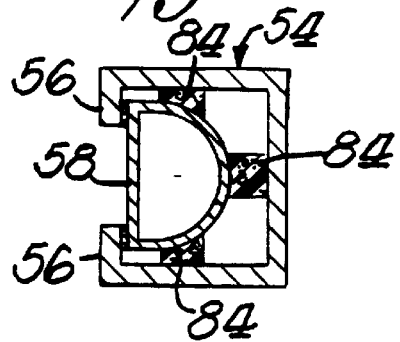

REINFORCED STRUCTURAL MEMBERS

CROSS REFERENCE TO RELATED APPLICATION

This application is a division of application Ser. No. 09/103,031, filed Jun. 23, 1998, U.S. Pat. No. 6,096,403 which in turn is based on provisional application Ser. No. 60/053,053, filed Jul. 21, 1997.

TECHNICAL FIELD

The present invention relates generally to methods and apparatus for reinforcing structural members and, more specifically, relates to local reinforcement of channel-shaped sections subject to bending.

BACKGROUND OF THE INVENTION

In a number of applications, particularly in the automotive industry, there is a need for light-weight, high-strength structural members. Although structural members having these characteristics can be readily obtained through the use of various metal alloys such as titanium alloys and the like, light-weight, high-strength alloys are generally cost prohibitive in automotive applications where weight reductions are closely balanced against the cost of materials. Moreover, reinforcement techniques are required which can be readily adapted to existing geometries of structural parts, thereby eliminating the need for fundamental design changes and providing a means by which substandard design performance can be remedied. That is, in many instances design deficiencies are discovered after vehicle design has reached the stage at which radical changes are no longer feasible.

In addition, a significant amount of emphasis has been placed on the performance characteristics of channel-shaped structural components which encounter forces that produce bending. For example, many side impact beams designed for motor vehicle doors have a channel-shaped cavity. In addition, many functional bumpers are channel-shaped. These channel-shaped sections are most susceptible to bending forces which originate at or concentrate in the midspan of the beam.

Although filling the entire section with plastic foam does significantly increase section stiffness (at least when high-density foams are utilized), this technique may also significantly increase mass and thus part weight, which, as stated, is undesirable in most applications. In addition, filling a section entirely with foam can contribute significantly to cost. Finally, a large foam core often creates an unwanted heat sink. And, although increasing the metal gauge of a section or adding localized metal reinforcements will increase stiffness, as the metal thickness increases, it becomes more difficult to form the part due to limitations of metal forming machines.

A number of approaches have been proposed for dealing with the problem of reinforcing channel-shaped sections subjected to bending as alternatives to high-cost alloys, thick-metal sections and large foam cores. For example, a side impact beam for a vehicle door has been proposed which comprises an open channel-shaped metal member having a longitudinal cavity which is filled with a thermoset or thermoplastic resin-base core. The core is disposed in the midspan of the beam. The core may include hollow glass microspheres in order to decrease density and thus weight.

A reinforcement insert comprising a precast reinforcement has been proposed. The reinforcement is formed of a plurality of pellets containing a thermoset resin and a blowing agent. The precast member is expanded and cured in place in a structural member. A composite tubular door beam reinforced with a syntactic foam core localized at the midspan of the tube has also been described in the art. The resin-based core occupies not more than one-third of the bore of the tube.

Tube-in-tube structures having high stiffness-to-mass ratios have also been proposed in which two nested tubes have a layer of foam disposed in the annulus between the tubes. A local reinforcement in the nature of a foamable resin disposed on a drop-in carrier has also been described. The carrier is placed in the channel of a hollow structural member following which the resin is expanded.

Accordingly, it would be desirable to provide a low-cost technique for reinforcing a channel-shaped section subjected to bending without significantly increasing the mass. It would also be desirable to provide a method of reinforcing an existing channel-shaped section which does not require any fundamental design change to the member. The present invention provides hollow sections which have increased strength with moderate increases in mass, all without the use of high volumes of expensive resins. The present invention further provides a method for reinforcing existing structural parts without redesigning the geometry of the part. It has been found that the present invention increases section stiffness and strength in channel-shaped sections in a highly efficient manner.

SUMMARY OF THE INVENTION

In one aspect the present invention provides a reinforced channel-shaped member having a thin, local reinforcement shell separated from the channel-shaped member by a layer of structural foam. At the reinforced section an arch extends in a direction opposite that of the force to which the member is subjected; that is, the arch projects in the direction of the compression face of the channel-shaped member. The arch may be present as the channel-shaped member, the reinforcement shell or both the channel-shaped member and the shell. A portion of the shell preferably contacts the channel-shaped member and is attached thereto by a spot weld or other means of attachment. The combination of the arch and the structural foam supports the load, stabilizes the walls of the channel-shaped member and distributes force over a generalized area away from concentration points at the welds. In one aspect, the reinforcement shell and the structural foam are preferably limited to no greater than about one third of the length of the channel-shaped member and are disposed substantially at the midspan of the channel-shaped member. In one aspect, the shell is disposed in the channel of the channel-shaped member and in another the shell forms a cap on the exterior of the channel-shaped member. The shell is preferably high-strength steel which allows low-strength steel to be used as the structural member. The shell could also be made from a reinforced plastic thicker than a steel shell. Also, in applications in which the main structural member is high-strength steel, the shell may comprise a mild steel or aluminum.

In still another aspect the present invention provides a method of reinforcing a structural part which includes the steps of forming a layer of structural foam at a local reinforcement site in a channel-shaped structural member. A reinforcement shell is placed at the midspan of the channel-shaped member and preferably extends no more than one-third the length of the channel-shaped member. The structural foam is placed on one surface of the shell which then contacts and bonds to the channel-shaped member.

These and other advantages and objects of the present invention will now be more fully described with reference to the drawings.

BRIEF DESCRIPTION OF THE DRAWINGS

FIG. 1 is a perspective view of a reinforced bumper illustrating the position of an arched mid-span reinforcement shell.

FIG. 2 is a cross section along lines 2—2 of FIG. 1.

FIG. 3 is a cross-section of another embodiment of the present invention illustrating a D-shaped reinforcement shell disposed in the cavity of a hollow bumper section and separated form the bumper section by a layer of structural foam.

FIG. 4 is a cross-section of another embodiment of the present invention illustrating a reinforcement shell having a D-shaped configuration; the reinforcement shell is disposed in the cavity of a hollow bumper section having a double arch with an intervening layer of structural foam.

FIG. 5 is a cross-section of another embodiment of the present invention illustrating a localized arch-shaped reinforcement disposed in the channel of a bumper section with an intervening layer of structural foam.

FIG. 6 is a cross-section of another embodiment of the present invention illustrating a D-shaped reinforcement shell disposed in a rectangular bumper section and separated by segmented regions of structural foam.

FIG. 7 is a cross-section of another embodiment of the present invention illustrating a an arch-shaped bumper having a rectangular reinforcement shell disposed thereon as a cap with an intervening layer of structural foam.

FIG. 8 is a cross-section of a double-arch bumper section with an arch-shaped reinforcement cap.

FIG. 9 is a perspective view of a reinforced door beam illustrating the position of a rectangular midspan reinforcement shell.

FIG. 10 is a cross-section along lines 10—10 of FIG. 9.

FIG. 11 is a cross-section of another embodiment of the present invention illustrating an arched door beam with an arched reinforcement shell with an intervening layer of structural foam.

DETAILED DESCRIPTION OF THE PREFERRED EMBODIMENTS OF THE INVENTION

Referring now to FIG. 1 of the drawings, reinforced automotive bumper 20 is shown having bumper section 22 in the nature of longitudinal, channel-defining structure having a length substantially greater than its width. Each edge of vertical planar wall 24 is bounded by sides 26. Each side 26 has a flange 28 that extends over open channel 30. Wall 24 defines an exterior surface or compression face 32 and a channel-side face or interior surface 34. It will be appreciated by those skilled in the art that compression face 32 receives the impact in a collision and is thus the region at which bending is induced.

Positioned at the mid-span of bumper section 22, that is, generally centrally located between ends 36 and 38, reinforcement shell assembly 40 is seen having arched reinforcement shell 42 and intervening foam layer 44. Thus, the shell may be considered a carrier for the foam layer. If the location of maximum deformation is not at the central location, the reinforcement shell assembly will be appropriately off-center at the location of maximum deformation.

Arched shell 42 has a pair of flanges 45 which overly and contact flanges 28 of bumper section 22. Arched shell has arch portion 46 which extends in the direction of wall 38 of bumper section 22. For the purposes of this application the terms "arched" and "arch" shall include not only a traditional U arch shape but also a D-shape, an example of which will be more fully illustrated hereinafter. Arch is also intended to include M or V or W shapes.

The structural member and the reinforcement shell may be metal stampings or may be roll formed metal.

Referring now to FIG. 2 of the drawings, the relationship of arched shell subassembly 40 and bumper section 22 is more clearly shown. Arched shell has surface 48 which is in contact with and bonded to foam layer 44. Again, arch portion 46 of shell 42 extends in the direction of wall 38 and thus extends toward compression face 32 of bumper section 22. Foam layer 44 is also in contact with and bonded to face 34 of wall 38 as well as to side wall inner surfaces 50, thereby attaching shell 42 rigidly to bumper section 22, forming a trilaminate construction. In addition, flanges 45 are attached to flanges 28 by mig welds, although or means of attachment such as mechanical fasteners or high-strength adhesive may be suitable in a particular application.

The length "L" of arched shell subassembly 40 is preferably equal to or less than one third of the length "L" of bumper section 22. The width "W" of channel 52 defined by arch portion 46 of shell 42 is preferably at least 75% of width "W" of channel 30 of bumper section 22. The depth "D" of shell 42 which extends into channel 30 is preferably at least 75% of the depth "D" of channel 30. Bell-shaped, stilted arches or D-shapes having a rise (D) to span (W) ratio of from about 0.5:1.0 to about 1.0:1.0 are most preferred.

As best illustrated in FIG. 2 of the drawings, shell 42 is a relatively thin gauge metal compared to that of bumper section 22. The metal used to form shell 42 and section 22 will typically be steel or aluminum. For example DI-form 140 steel between 0.8 and 1.4 mm is particularly preferred for shell 42. (And note that while metal is preferred, other materials such as plastic may be appropriate in a given application). One of the advantages of the present invention is the ability to use are relatively low-strength steel for bumper section 22 while reinforcing the structure with a light-weight, thin, high-strength steel shell 42. By providing an arch 46 in the direction of compression face 32; an intervening layer of adhesive foam 44 which is bonded to shell 42 and to section 22; and spot welding (or otherwise attaching) shell 42 to section 22, reinforced bumper 20 provides maximum resistance to bending with minimal weight and cost. The combination of arch 46 and foam 44 in compression reinforces bumper section 22 for a substantial reduction in buckling. It is to be understood that foam layer 44 covers substantially all of surface 48 of shell 42.

Foam 4 is preferably a resin-based material which incorporates hollow glass microspheres to reduce density. With specific reference now to the composition of foam layer 44, the density of the material should preferably be from about 20 pounds per cubic feet to about 40 pounds per cubic feet to minimize weight. The melting point, heat distortion temperature and the temperature at which chemical breakdown occurs must also be sufficiently high such that foam layer 44 maintains it s structure at high temperatures typically encountered in paint ovens and the like. Therefore, foam 44 should be able to withstand temperatures in excess of 200 degrees C. and preferably 175 degrees C. for short times. Foam layer 4 has a thickness of preferably about 2 to 8 mm around the arch.

In one particularly preferred embodiment foam layer 44 includes a synthetic resin, glass microspheres, a blowing agent and a filter. Foam 4 is preferably expanded in place between shell 42 and section 22 and is prepared by blending together the following materials. A synthetic resin comprises from about 50 percent to about 80 percent by weight and more preferably from about 60 percent to about 75 percent by weight of the mixture used to form foam 44. Glass microspheres comprises from about 10 to about 40 percent by weight and more preferably from about 15 to about 25 percent by weight of the mixture. A blowing agent comprises from about 1 to about 10 percent by weight and more preferably from about 2 to about 6 percent by weight of the mixture.

Layer 44 could be initially applied in unexpanded form to either shell 42 or section 22 and then expanded into intimate contact with the other member and thereby bonded to both members 22 and 42. Where the foam is heat expandable and the structural member is a vehicle part, use could be made of the paint oven to initiate expansion of the foam, without requiring a separate heating step.

Various fillers (such as fumed silica, calcium carbonate, milled glass fiber, and chopped glass strand) may be included. A filler comprises from about 1 percent to about 10 percent by weight and preferably from about 3 percent to about 8 percent by weight of the mixture used to form foam 44.

Preferred synthetic resins for use in the present invention include thermosets such as epoxy resins, vinyl ester resins, thermoset polyester resins, and urethane resins. It is not intended that the scope of the present invention be limited by molecular weight of the resin and suitable weights will be understood by those skilled in the art based on the present disclosure. Where the resin is a thermoset resin, various accelerators, such as imidizoles and "DMP 30", and curing agents, preferably di-cyanamide, may also be included to enhance the cure rate. A functional amount of accelerator is typically from about 1 percent to about 3 percent of the resin weight with a corresponding reduction in resin, microspheres or filler. Similarly, the amount of curing agent used is typically from about 2 percent to about 8 percent of the resin weight with a corresponding reduction in resin, microspheres or filler. Effective amounts of processing aids, stabilizers, colorants, UV absorbers and the like may also be included in layer. Thermoplastics may also be suitable in some applications.

In the following tables, preferred formulations for use in forming foam 44 are described. All percentages in the present disclosure are percent by weight unless otherwise specifically designated.

| INGREDIENT | PERCENTAGE BY WEIGHT | | | |
|---|---|---|---|---|
| | FORMULA 1 | | | |
| One Part | Bisphenol A Epoxy | 70% | | |
| | Nipol Liquid Rubber | 8% | | |
| | Di-cy Curative | 7% | | |
| | EMI-24 Accelerator | 1% | | |
| | B38 Microspheres | 14% | | |
| | FORMULA II | | | |
| | Resin Side "A" | | Curative Side "B" | |
| Two Part | Epoxy Resin | 74% | Aliphatic Amine | 65% |
| | Celogen Blowing Agent | 6% | Thixotrope | 8% |
| | Thixotrope | 4% | K20 Microspheres | 27% |
| | K20 Microspheres | 16% | | |

In addition to the structure illustrated in FIGS. 1 and 2 of the drawings, the present invention provides a number of other configurations which embody the inventive concepts of the present invention as a motor vehicle bumper. More specifically, and referring now to FIG. 3 of the drawings, structural member or main bumper section 54 is shown having flanges 56 that are welded to local reinforcement shell 58. Structural foam 60 is shown bonding shell 58 in place in the channel defined by bumper section 54. In FIG. 4, bumper section 62 has a double arch portion 64 having twin arches 66 and 68. Structural foam layer 70 is disposed in the channel defined by section 62. As with the structure described in FIG. 4, shell 72 is D-shaped and is attached to flanges 74. In FIG. 5, shell 76 having a stilted arch configuration is utilized in combination with a double arch main bumper section 78. Shell 76 has a pair of flanges 80 that are attached to corresponding flanges 82 of bumper section 78. FIG. 6 is a modification of the structure depicted in FIG. 3, with the foam layer being segmented, i.e. provided as separate spaced linear rows or ribbon 84.

Referring now to FIG. 7 of the drawings, reinforcement shell 86 forms an external cap on bumper section 88. Bumper section 88 has the stilted arch configuration and is provided with flanges 90 that are attached to ends 92 of shell 86. Foam layer 94 is seen in the channel defined by shell 86. In FIG. 8, bumper section 94 has double arch structure 96 and is separated from arched reinforcement shell or cap 98 by foam layer 100.

In addition to reinforced bumpers, the present invention is useful in reinforcing door side beams. Referring now to FIG. 9 of the drawings, door side impact beam 102 is shown generally having beam section 104 defining arch 106. As seen in FIGS. 9 and 10, reinforcement cap or shell 108 is provided and is attached (preferably by spot welding) to beam section 104 at flanges 110 and 112. An intervening layer of foam is disposed between inner surface 114 of cap 108 and outer surface 116 of beam 104. Alternatively, the cap and beam section could be reversed; that is, part 108 could be the beam and part 104 an internal cap. It is to be understood that this reversal could be achieved in all of the preferred designs, including those described in connection with the bumper. In FIG. 11 of the drawings still another configuration is shown in which two complementary arches are nested one within the other. Part 118 can form either the cap or the main beam body with part 120 forming the corresponding shell or beam. Foam 122 is shown disposed between parts 118 and 120 in the manner previously described.

In still another aspect the present invention provides a method of reinforcing a structural part which includes the steps of forming a layer of structural foam at a local reinforcement site in a channel-shaped structural member. A reinforcement shell is placed at the midspan of the channel-shaped member and preferably extends no more than one-third the length of the channel-shaped member. The structural foam is placed on one surface of the shell which then contacts and bonds to the channel-shaped member.

While the invention has been described primarily in connection with vehicle parts, it is to be understood that the invention may be practiced as part of other products, such as aircrafts, ships, bicycles or virtually anything that requires energy for movement. Similarly, the invention may be used with stationary or static structures, such as buildings, to provide a rigid support when subjected to vibration such as from an earthquake or simply to provide a lightweight support for structures subjected to loads. Additionally, while the invention has been described primarily with respect to heat expandable foams and with respect to metal parts such as the structural member and shell, other materials can be used. For example, the foam could be any suitable known expandable foam which is chemically activated into expansion and forms a rigid structural foam. The shell could be made of materials other than metal such as various plastics or polymeric materials or various wood type fibrous materials having sufficient rigidity to function as a back drop or support for the foam. Where a heat expandable foam is used the support or backdrop should be able to withstand the heat encountered during the heat curing. Where other types of foam materials are used, however, it is not necessary that the support member be able to withstand high temperatures. Instead, the basic requirement for the support member is that it have sufficient rigidity to function in its intended manner. It is also possible, for example, to use as the shell materials which in themselves become rigid upon curing or further treatment. The invention may also be practiced where the structural member is made of materials other than metal. It is preferred, however, that materials be selected for the structural member and shell as well as the foam so that the thin unexpanded foam upon expansion forms a strong bond with these members so that a structural composition will result.

What is claimed is :

1. A reinforcement shell for being inserted into and reinforcing a channel shaped structural member comprising a carrier, said carrier being arch shaped having a pair of ends interconnected by an intermediate portion, said intermediate portion having diverging sloping walls for distributing force over a generalized area away from concentration points at locations where said shell would be interconnected to the structural member and for maximizing resistance to bending and buckling, said carrier having an outer surface, said carrier being made of a thin and lightweight and high strength material, an expandable resin layer on said outer surface of said carrier, said resin layer being disposed in a cross sectional pattern on said outer surface having opposite end portions of said pattern separated from each other by said ends of said carrier being between said opposite end portions of said pattern whereby said resin layer would be located toward an inner surface of the structural member, and said resin layer being made of a material which upon expanding is capable of intimately bonding to said outer surface and to the inner surface of the structural member into which said carrier may be inserted whereby upon expanding said resin layer material would form a structural foam for reinforcing the structural member.

2. The shell of claim 1 wherein said carrier is made of thin gauge metal.

3. The shell of claim 1 wherein said carrier is made of reinforced plastic.

4. The shell of claim 3 wherein said plastic carrier is from 2 to 6 mm thick.

5. The shell of claim 1 wherein said carrier has a thickness of from 0.3 to 1.4 mm.

6. The shell of claim 1 wherein said diverging sloping walls form a smooth curve merging into said pair of ends, and said pair of ends being free ends which are generally parallel to each other whereby said carrier is of U shape.

7. The shell of claim 6 wherein said free ends terminate in outwardly directed coplanar flanges which are free of said resin layer.

8. The shell of claim 1 wherein said carrier is of D shape with said intermediate portion being curved and smoothly merging into said pair of ends, and a straight wall interconnecting said free ends to form a hollow tubular shape.

9. The shell of claim 8 wherein said straight wall is free of said resin layer.

10. The shell of claim 9 wherein said resin layer is of segmented form on said outer surface.

11. The shell of claim 1 wherein said resin layer is of segmented form on said outer surface.

12. The shell of claim 1 wherein said resin layer is disposed in a plurality of spaced linear rows to comprise said segmented form.

13. The shell of claim 1 wherein said resin layer pattern is generally U-shaped.

14. A reinforcement shell for being mounted around and reinforcing a channel shaped structural member comprising a carrier, said carrier having a pair of ends interconnected by an intermediate portion, said carrier having an inner surface, an expandable resin layer on said inner surface, said pair of ends being spaced from each other to form an open area between said free ends whereby said shell may be placed over and at least partially around the structural member, said resin layer being disposed in a cross sectional pattern on said inner surface of said carrier with opposite end portions of said pattern spaced from each other by said open area between said free ends whereby said resin layer would be located toward an outer surface of the structural member when said carrier is mounted at least partially around the structural member, and said resin layer being made of a material which upon expanding is capable of intimately bonding to said inner surface of said carrier and to the outer surface of the structural member whereby upon expanding said resin layer material would form a structural foam for reinforcing the structural member.

15. The shell of claim 14 wherein said carrier is made of a thin and lightweight and high strength material.

16. The shell of claim 15 wherein said carrier is made of thin gauge metal.

17. The shell of claim 15 wherein said carrier has a thickness of 0.8 to 1.4 mm.

18. The shell of claim 14 wherein said intermediate portion is of an arch shape merging into said pair of ends, and said pair of ends being parallel free ends.

19. The shell of claim 14 wherein said resin layer pattern is generally U-shaped.

20. A reinforcement shell for reinforcing a structural member comprising a carrier, said carrier having a pair of ends interconnected by an intermediate portion, said carrier having an inner surface, an expandable resin layer on said inner surface, said pair of ends being spaced from each other to form an open area between said free ends whereby said shell may be placed over and at least partially around a structural member, said resin layer being made of a material which upon expanding is capable of intimately bonding to said inner surface of said carrier and to an outer surface of the structural member whereby upon expanding said resin layer material would form a structural foam for reinforcing the structural member, said intermediate portion being of an arch shape merging into said pair of ends, and said pair of ends being parallel free ends, and said free ends terminating in coplanar inwardly directed flanges.

* * * * *